United States Patent [19]
Helmy et al.

[11] Patent Number: 5,937,329
[45] Date of Patent: Aug. 10, 1999

[54] SYSTEM AND METHOD FOR DISPLAYING LOCAL MESSAGES OVER A SATELLITE TELEVISION PICTURE

[75] Inventors: Dia Helmy, Ottawa; Len Stone, Calgary, both of Canada

[73] Assignee: Northern Telecom Limited, Montreal, Canada

[21] Appl. No.: 08/960,697

[22] Filed: Oct. 29, 1997

[51] Int. Cl.[6] .................................................. H04N 7/173
[52] U.S. Cl. ............................................. 455/3.2; 348/10
[58] Field of Search ...................................... 348/9, 8, 584, 348/10, 12, 13, 7, 563, 569, 565; 455/3.2, 5.1, 6.1, 2, 3.1, 6.3, 6.2, 4.2; 379/93.25, 102.03, 93.17; H04N 7/20

[56] References Cited

U.S. PATENT DOCUMENTS

| | | | |
|---|---|---|---|
| 3,891,792 | 6/1975 | Kimura | 348/622 |
| 4,356,509 | 10/1982 | Skerlos et al. | 358/85 |
| 4,388,645 | 6/1983 | Cox et al. | 358/147 |
| 4,414,432 | 11/1983 | Skerlos et al. | 172/2 |
| 5,414,773 | 5/1995 | Handelman | 380/49 |
| 5,488,412 | 1/1996 | Majeti et al. | 348/10 |
| 5,564,001 | 10/1996 | Lewis | 395/154 |
| 5,574,779 | 11/1996 | Ely et al. | 379/207 |
| 5,684,525 | 11/1997 | Klosterman | 348/12 |
| 5,703,795 | 12/1997 | Mankovitz | 364/514 R |
| 5,764,886 | 6/1998 | Danielson et al. | 395/184.01 |

*Primary Examiner*—Chris Grant

[57] ABSTRACT

A system and method for providing community interest messages to subscribers to broadcast satellite services. A connection is established between a subscriber's satellite receiver and a message center. The message center downloads messages to the receiver. The receiver then writes these to the overlay display buffer which causes them to be displayed on the television display in addition to whatever video signal is being displayed.

22 Claims, 6 Drawing Sheets

SYSTEM AND METHOD FOR DISPLAYING LOCAL MESSAGES OVER A SATELLITE TELEVISION PICTURE

FIELD OF THE INVENTION

The invention relates to systems and methods for distributing community interest messages to satellite television subscribers.

BACKGROUND OF THE INVENTION

Cable television providers are able to provide their subscribers with community interest information either through a dedicated channel which constantly displays such information, or by overlaying such information over other channels which are also showing regular programming. Such community interest information might include local weather, news and advertising, for example.

There is an increasing use of satellite television services by residential customers. However, the widespread use of such satellite services has been hampered by the need for subscribers to be able to receive community interest information. There is currently no known art which enables the receipt of community interest information by television users who only have a satellite connection. Satellite based service providers are not local in nature, instead providing service to very large geographical areas. Broadcasting community interest messages over satellite channels would require that different message streams be provided for a large number of different communities and this is impractical due to the limited amount of satellite transmission bandwidth available.

Subscribers to existing satellite services who are located in large metropolitan centres may in some cases receive community interest information which is broadcast nationwide via satellite for example on "superstations" originating in these large centres. For the remainder of the population, existing satellite services do not and cannot provide such community interest information.

It is noted that the use of the PSTN (public switched telephone network) by satellite service providers in existing systems is limited to the transmission of subscriber accounting information and viewing patterns from subscriber locations to the satellite service provider.

SUMMARY OF THE INVENTION

It is an object of the invention to obviate or mitigate one or more of the above identified disadvantages.

According to a first broad aspect, the invention provided a satellite receiver equipped to receive satellite signals from a satellite dish and to demodulate the satellite signals and display them as a video picture on a display, the satellite receiver further comprising: a) a modem connected to the PSTN (public switched telephone network) for receiving a message sent over the PSTN; and b) a message display mechanism for displaying the message on the display over the video picture.

According to a second broad aspect, the invention provides a system for delivering community interest messages to satellite television subscribers comprising a message centre and a satellite receiver, wherein: the message centre is for collecting community interest messages, and for being connected with a connection through the PSTN (public switched telephone network) to a satellite receiver in the subscriber's premises, and for subsequently transmitting the community interest messages over the connection; and wherein the satellite receiver in the subscriber's premises is equipped to receive satellite signals from a satellite dish and to demodulate the satellite signals and display them as a video picture on a display, and the satellite receiver further comprises a modem connected to the PSTN for receiving the message sent over said connection, and a message display mechanism for displaying the message on the display over the video picture.

According to a third broad aspect, the invention provides a method of delivering community interest messages to satellite television subscribers comprising the steps of: establishing a connection between a message centre and a particular subscriber's telephone and satellite receiver; the message centre transmitting a message to the satellite receiver over the connection; and the satellite receiver receiving the message and displaying it on a television display in addition to a video picture received via satellite.

BRIEF DESCRIPTION OF THE DRAWINGS

Preferred embodiments of the invention will now be described with reference to the attached drawings in which.

DETAILED DESCRIPTION OF THE PREFERRED EMBODIMENTS

Figure 1:
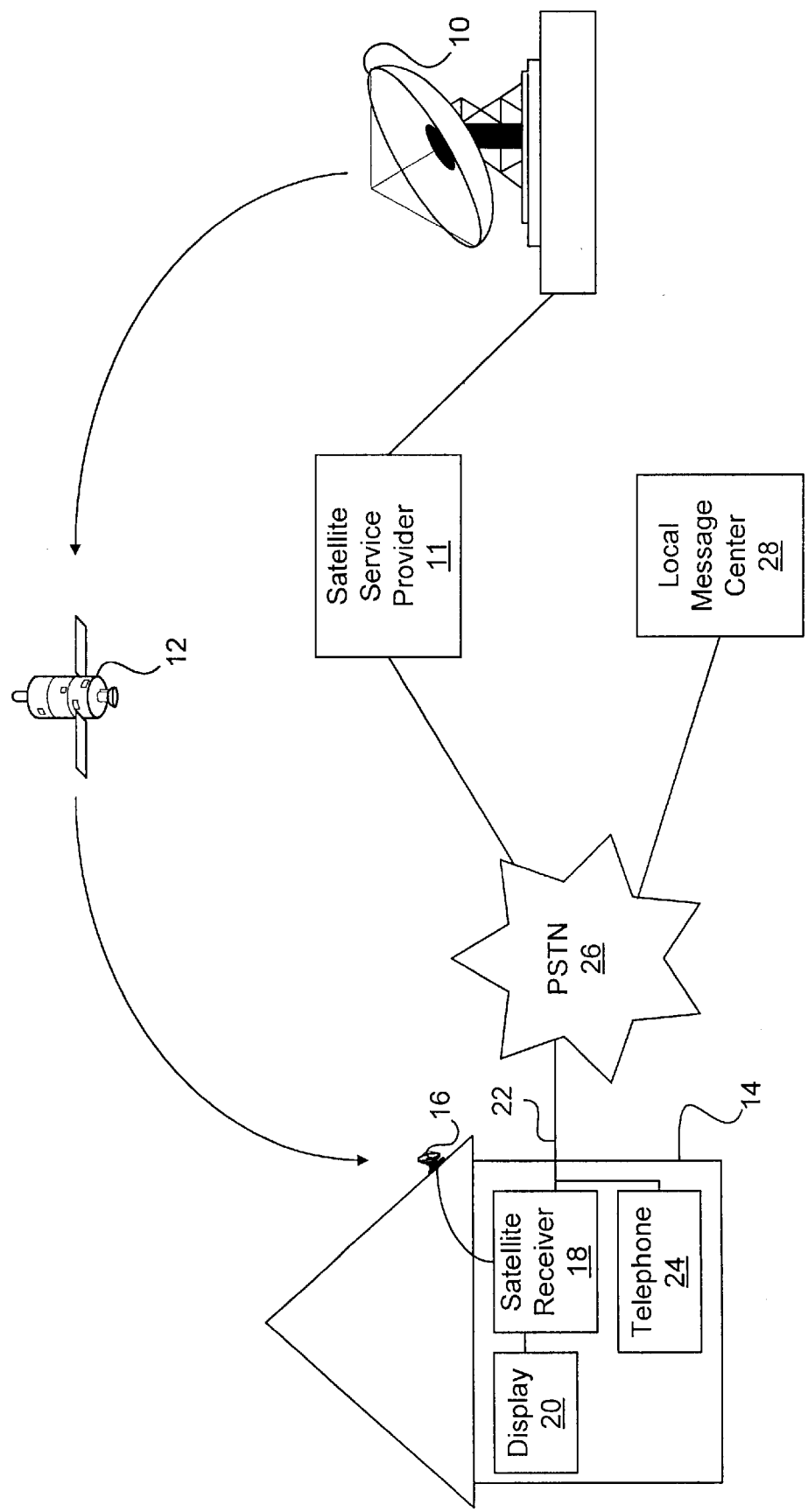
FIG. 1 is a high level block diagram of a message distribution system according to an embodiment of the invention.

Referring firstly to FIG. 1, a system for providing broadcast satellite services with community interest message delivery capability according to an embodiment of the invention includes a ground station 10 for a satellite service provider 11 to send national broadcast material to a broadcast satellite 12 for subsequent broadcast to subscriber locations. The satellite service provider 11 has a connection to the PSTN (public switched telephone network) 26 to receive billing information from subscriber locations.

A particular subscriber location located within the coverage area of the satellite 12 is generally indicated by 14. The subscriber location 14 is equipped with a satellite dish 16 and a satellite receiver 18 for receiving the material broadcast by the satellite 12 and for controlling what is to be displayed on a display 20 such as a television connected to the satellite receiver 18. The satellite receiver 18 is connected through a telephone connection to a telephone line 22 servicing the subscriber location 14. As indicated previously, the function of this connection has conventionally been to allow the satellite receiver 18 to convey accounting information to the satellite service provider 11, for example by dialling up the satellite service provider's 1-800 telephone number. A normal telephone 24 is also connected to the telephone line 22.

The telephone line 22 servicing the subscriber location 14 is connected to the PSTN 26. In addition, a local message centre 28 is connected to the PSTN.

The message centre 28 is responsible for collecting message information from news sources or advertisers for example, and for formatting this into messages for distribution to satellite television subscribers. It may maintain a list of subscribers who are to receive each message.

Further details of the equipment at the subscriber location 14 will be described now with reference to FIG. 2 where the satellite receiver 18, satellite dish 16, display 20, and telephone line 22 have been numbered as in FIG. 1. The satellite receiver 18 includes a processor 30 for running a satellite receiver control program 32, and memory and registers generally indicated by 34 for use by the satellite receiver control program. The processor 30 is connected to a demodulator 38, a display interface module 40 and to a modem 36 which is connected to the telephone line 22. The modem is of a type capable of extracting CLID (calling line identification) information from incoming calls. The satellite receiver control program is equipped to receive the CLID of incoming calls through the modem. The display interface module 40 is connected to the display 20 and the demodulator 38. The demodulator 38 is connected to the satellite dish 16. The satellite receiver control program 32 runs on the processor 30 and controls the operation of the satellite receiver 18. The demodulator 38 receives signals from the satellite dish 16 and demodulates them under control of conventional demodulator control signals 42 from the satellite receiver control program 32 to produce a selected video signal 44, the video signal for a particular channel for example. The video signal 44 is passed through the display interface module 40 which outputs a display signal 46 to the display. The satellite receiver control program 32 also has text write access to an overlay display memory (not shown in FIG. 2) forming part of the registers and memory 34. When text is written to the overlay display memory, the display interface module 40 reads it and combines it with the selected video signal 44 to produce a display signal 46 which includes both the video signal and the overlay text.

Figure 3:
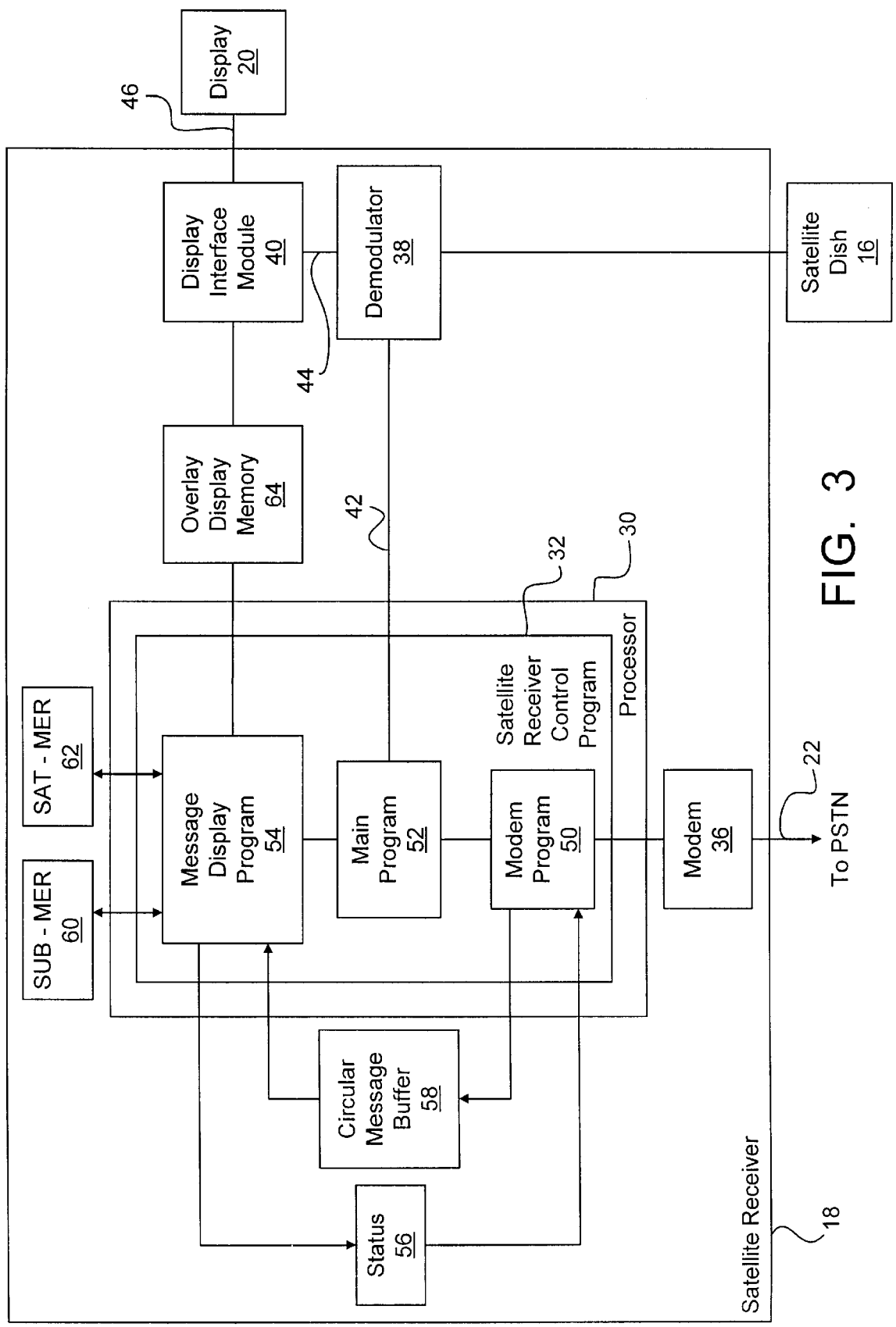
FIG. 3 is a more detailed block diagram of the subscriber apparatus of FIG. 2.

A further breakdown of the satellite receiver functionality will be described with reference to FIG. 3. The satellite receiver control program 32 includes three subprograms, these being a modem control program 50, a main program 52, and a message display program 54. Preferably, these three programs are integrated into a single program running on a single processor 30, as illustrated. However, alternatively the programs may implemented as standalone programs on one or more separate designated processors.

Figure 2:
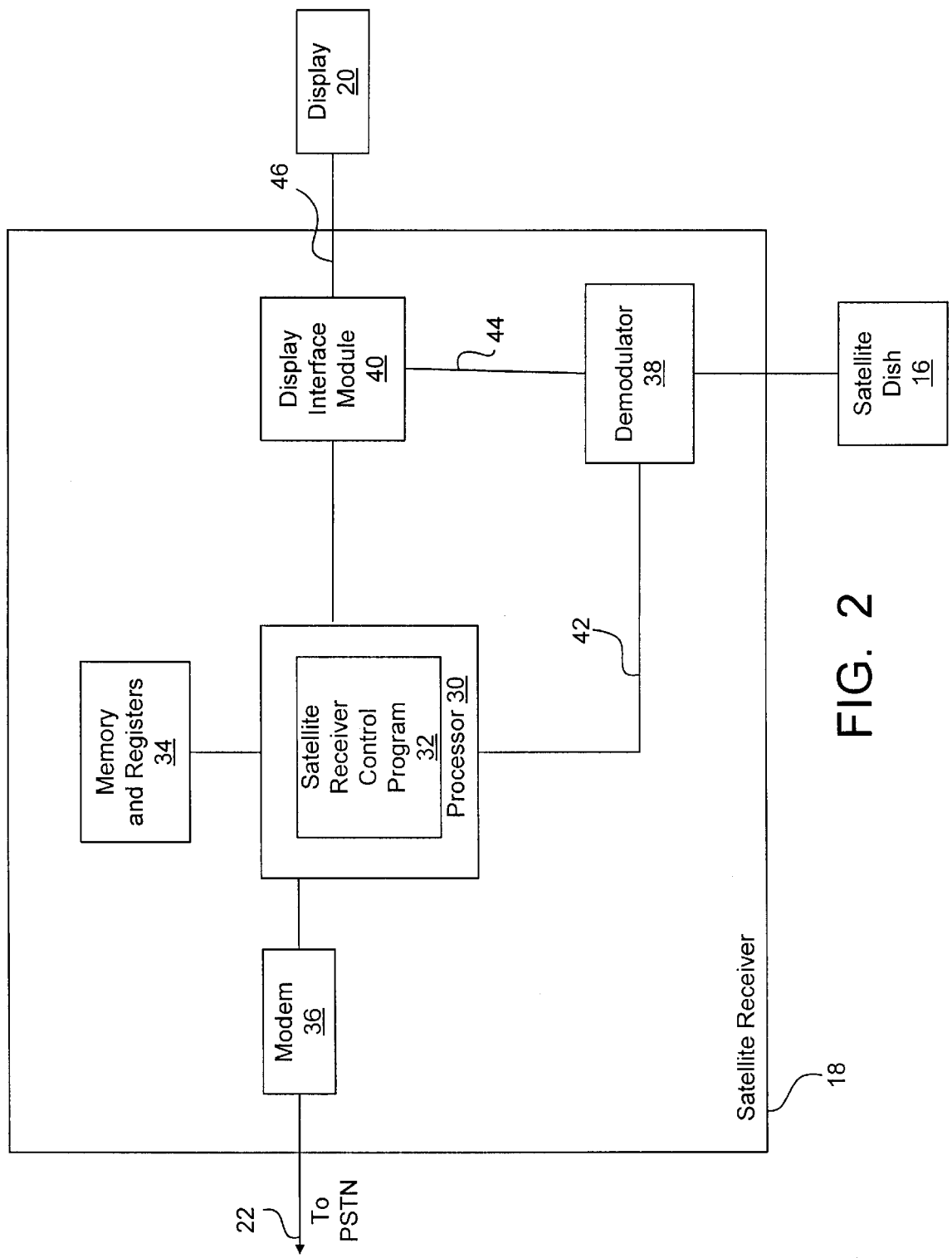
FIG. 2 is a block diagram of apparatus at the subscriber location which is incorporated In the message distribution system of FIG. 1.

The memory and registers 34 referred to with respect to FIG. 2 include a status buffer 56, a circular message buffer 58, a SUB-MER (subscriber message enable register) 60, a SAT-MER (satellite message enable register) 62, and the overlay display memory 64 referred to previously. The message display program 54 has the ability to write text to the overlay display memory 64 with the result that this text is combined with the selected video signal 44 as described above and displayed on the display 20.

The main program 52 performs the functions of controlling the channel selection through the demodulator 38, and processing commands from a remote control if present (not shown), among others. It also generates billing messages.

The modem program 50 runs in parallel with the main program 52 and is used to send billing messages generated by the main program to the satellite service provider. In addition as described below, through the modem 36 it receives and identifies incoming message alert signals which indicate that subsequent community interest messages are on their way. It then receives these incoming messages and writes them to the circular message buffer 58.

The message display program 54 is run periodically by the main program 50 for example. It reads messages stored in the circular message buffer 58 and writes them to the overlay display memory 64 with the result that they are displayed on the display 20 as described previously.

Further details of message alerting, message downloading, and message display will now be provided. In order to alert the modem program 50 that a message is coming from the message centre, a message alert procedure is performed. There are many ways of implementing a message alert procedure, only one example of which will be described here. The message centre dials the subscriber's telephone directory number using common and well-known procedures. Preferably, a no-ring connection is made meaning that a connection is made without ringing the subscriber's telephone. In so doing, the message centre uses a unique predetermined CLID to identify itself to the satellite receiver 18. The satellite receiver's modem 36 answers the call when it detects the CLID of the incoming call to be the predetermined message centre CLID, and recognizes the predetermined message centre CLID to be a message alert signal.

Figure 4:
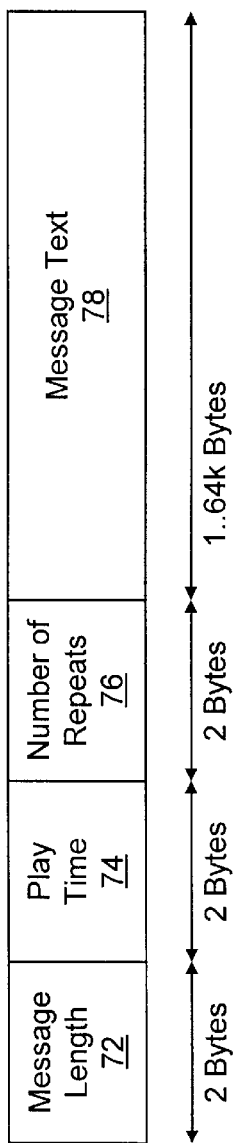
FIG. 4 is an illustration of a message format for use with the message distribution system of FIG. 1.

After the satellite receiver 18 has been alerted by the message centre that a message is about to be sent as described above, the message centre proceeds with sending a message. Although many different message formats may be acceptably used with this and other embodiments of the invention, a preferred message format is shown in FIG. 4. This type of message includes five fields, these being message ID 70, message length 72, play time 74, number of repeats 76, and message text 78.

Figure 5:
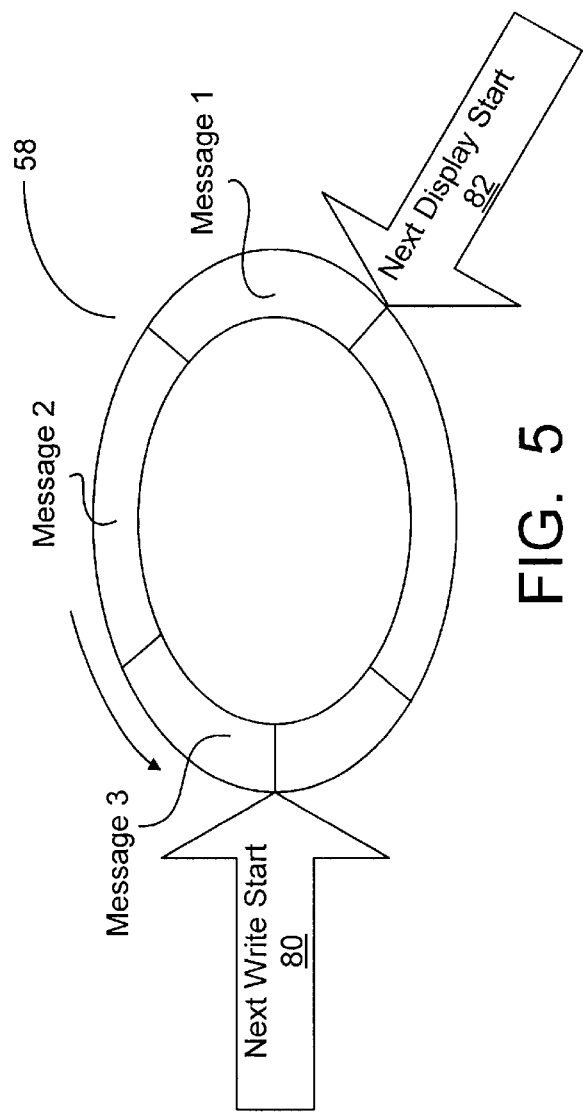
FIG. 5 is an illustration of a circular message buffer of FIG. 2 used for controlling the receipt, storage and display of messages by the message distribution system of FIG. 1.

To deliver the message, the message is downloaded by the message centre to the satellite receiver 18. The modem program 50 receives the message and writes it into the circular message buffer 58. A pictorial representation of the circular message buffer 58 is shown in FIG. 5. Incoming messages are written to the circular message buffer 58 in the order they are received. A "next write start" pointer 80 is maintained by the modem program 50 which points to the next vacant message storage location in the buffer 58. The buffer 58 is circular in the sense that when the buffer is full, the oldest messages are overwritten in sequence.

After a message has been downloaded to the satellite receiver 18 and stored in the circular message buffer 58, the message display program 54 reads it from the circular message buffer and writes it to the overlay display memory 64, with the result that it is subsequently written to the display 20 over (and in addition to) the current video display. Messages are read in sequence from the circular buffer 58. When the last message has been read, the message display program 54 returns to the first message stored. The message display program 54 maintains a "next display start" pointer 82 which points to the next message to be displayed. In the circular message buffer example of FIG. 5, three messages have been downloaded into the buffer, namely message 1, message 2, and message 3. The next write start pointer 80 points to a position in the buffer after message 3. The next display start pointer 82 is shown pointing to message 1. After message 1 is read, the next display start pointer 82 will be incremented to point to message 2 and so on. After message 3 has been displayed, the next display start pointer 82 will be set to point to message 1 again. The circular message buffer 58 may be maintained as a circular linked list for example.

The display of each individual message may be tailored in many ways by providing appropriate fields in the message, and by providing appropriate processing abilities to the message display program. For example, with the message format illustrated in FIG. 5, a play time field 74 is provided for inserting the preferred time period in which the message is to be displayed. If a message has not been displayed by the time period specified in this field, then it is discarded or allowed to be overwritten. The message structure illustrated in FIG. 5 also includes a number of repeats field 76 for inserting a preferred number of times which the message is to be repeated on the display. Each time a message is read from the circular message buffer 58 and successfully displayed on the display, this number of repeats field 76 is decremented. When it reaches zero, the message is discarded or allowed to be overwritten.

Figure 6:
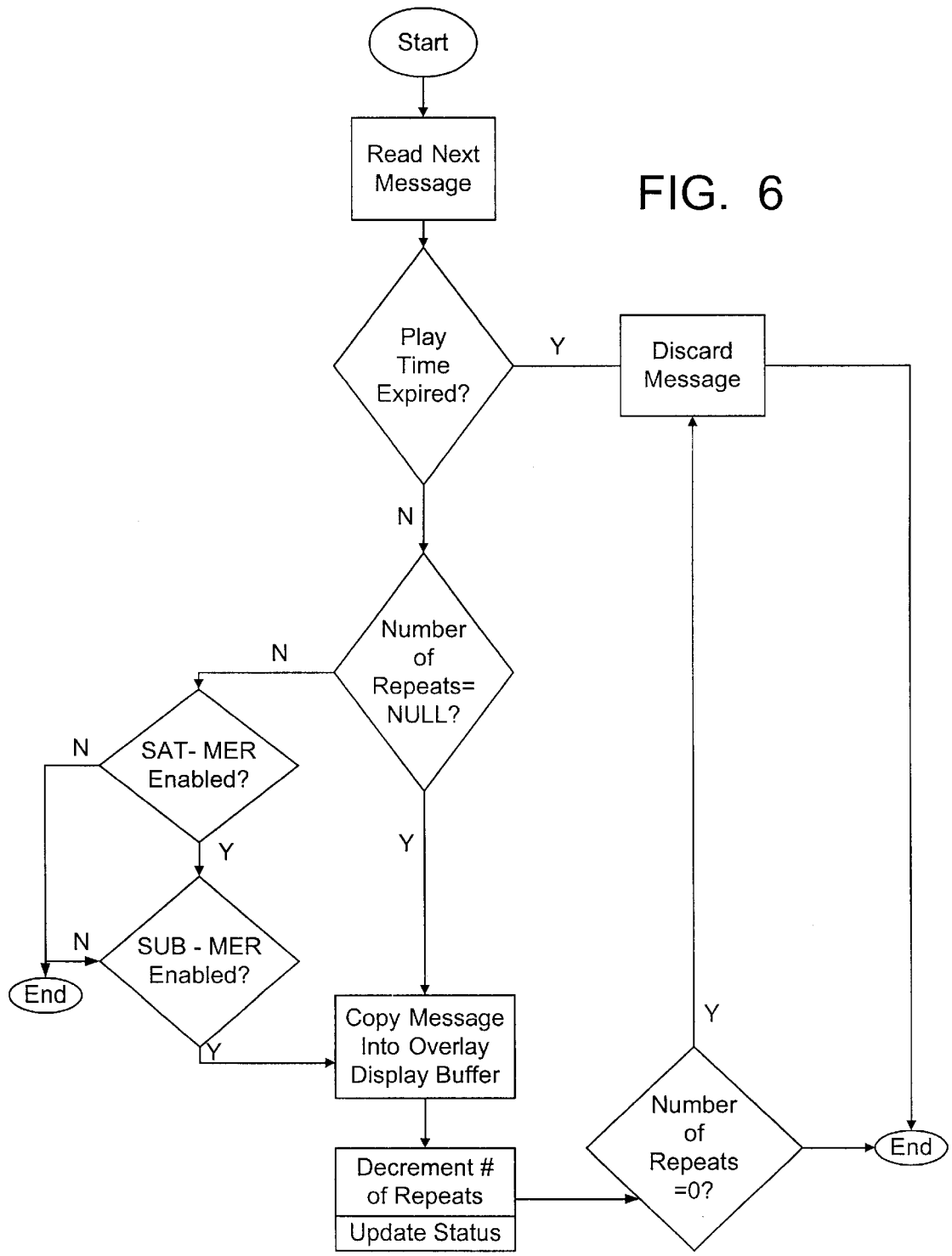
FIG. 6 is a flow chart of steps taken by the satellite receiver of FIG. 1 for controlling whether or not messages are to be displayed.

A mechanism may be provided which allows the message centre, the satellite service provider, and the subscriber to enable and disable the display of messages, thereby also allowing each of these parties to select preferred times to display messages. An override mechanism may also be provided which allows important messages to be displayed notwithstanding the fact that message display has been disabled by one or more of the above identified parties. There are of course many different ways by which these objectives may be met, and a flowchart for a simple realization is shown in FIG. 6.

As described above, the message centre may control when messages are displayed through the use of the play time field 74 in the message.

The register SAT-MER 62 is maintained by the satellite service provider through a satellite program control channel forming part of the satellite transmission. It is a simple enable/disable register which when set to ENABLE, allows messages to be displayed, and when set to DISABLE does not allow messages to be displayed.

The register SUB-MER 60 is maintained by the subscriber, through the use of the remote control for example. SUB-MER is also a simple enable/disable register which when set to ENABLE allows messages to be displayed, and when set to DISABLE does not allow messages to be displayed.

The number of repeats field in the message format may be used to indicate an override status for that message. A NULL value in the repeat field may be used to indicate that the message is to be displayed notwithstanding either of the enable/disable registers SUB-MER or SAT-MER having a DISABLE state.

Referring now to the flowchart of FIG. 6, each time the message display program reads a message from the circular message buffer, it first checks to see if the play time has expired, and if so, discards the message. Next, the number of repeats field is checked. If a NULL value is found, then that message is copied into the overlay display memory. If no NULL value is found, then the SAT-MER enable/disable register is checked for a DISABLE state. If a DISABLE state is present, then the message is not displayed. Next, the SUB-MER register is checked for a DISABLE state. If a DISABLE state is present, then the message is not displayed. Otherwise, the message is copied to the overlay display memory.

Each time a message is displayed, the number of repeats field in the message in the circular message buffer is decremented until it reaches zero at which time the message is discarded. Also, a status buffer may be updated as described below. If after decrementing, the number of repeats field is zero, the message is discarded.

Figure 7:
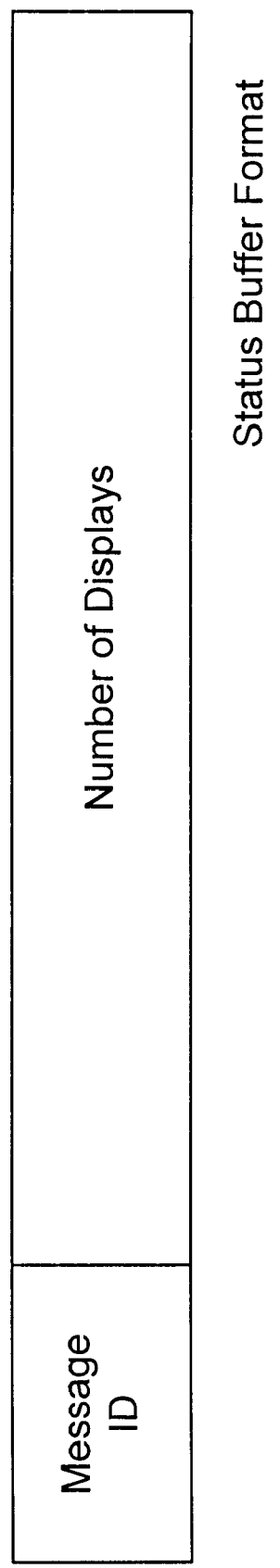
FIG. 7 is an illustration of a status buffer format for use with the message distribution system of FIG. 1.

A mechanism may be provided for the message centre to collect status information from the satellite receiver for accounting purposes. For example, a status buffer may be maintained by the satellite message display program for each message consisting of a record of the form illustrated in FIG. 7 which includes a field for the message ID and a corresponding number of displays field for the number of times that message was displayed. Each time a message is successfully written to the overlay display memory, the number of displays field is incremented by one. Periodically, the status buffer may be uploaded to the message centre. For example, in response to every 50th message alert. The status buffer may then be initialized for future counts.

Preferably, if the subscriber attempts to make a telephone call during message download, the modem detects this and terminates the connection between the message centre and the satellite receiver. Also, if a normal telephone call comes in during a download session, preferably the download session is terminated and the call connected. This may be implemented on lines equipped with call waiting. The modem can be configured to drop the download connection upon receipt of a call waiting signal.

Numerous modifications and variations of the present invention are possible in light of the above teachings. It is therefore to be understood that within the scope of the appended claims, the invention may be practised otherwise than as specifically described herein.

The message centre functionality may be distributed geographically in many different ways.

For example, separate message centres may be provided for each locality. Alternatively, these may be implemented in the form of a few AIN (advanced intelligent network) devices.

There may be multiple message centres serving a given subscriber. In this case, the calling line ID function forming part of the subscriber's satellite receiver must be capable of detecting a unique directory number in connection with each of these different message centres.

In the illustrated embodiment, the calling line ID is used to identify an incoming call as being one from a message centre which thus requires answering by the satellite receiver for the subsequent receipt of messages. However, it is contemplated that there may be other mechanisms for determining whether an incoming call should be answered by the satellite receiver. For example, some other type of signalling information may be present in the incoming call which identifies the type of the call as a message centre call.

In another embodiment, rather than the message centre placing calls to the subscriber's directory number and downloading messages, the satellite receiver is configured to periodically dial a pre-programmed message centre directory number. Once a connection is established this embodiment is the same as the previously described embodiment. The important factor is that one way or another a connection is established between the subscriber's modem and the message centre.

The embodiments of the invention in which an exclusive property or privilege is claimed are defined as follows:

1. A satellite receiver equipped to receive satellite signals from a satellite dish and to demodulate the satellite signals and display them as a video picture on a display, the satellite receiver further comprising:
   a) a modem connected to a PSTN (public switched telephone network) for receiving a message sent over the PSTN;
   b) a display overlay buffer;
   c) a message buffer;
   d) a satellite receiver control program running on a processor for storing the received message in the message buffer and for transferring a message from said message buffer to said display overlay buffer at times automatically determined by the satellite receiver control program; and
   e) a display interface module for combining the video picture with the message stored in the display overlay buffer to produce a display signal to be sent to the display to be displayed.

2. A satellite receiver according to claim 1 further comprising means in the satellite receiver to receive a call through the modem and to determine whether the call is a message centre call and should thus be answered by the modem and to establish a connection between the modem and a message centre over which to receive the message.

3. A satellite receiver according to claim 2 further comprising a calling line ID function which is programmed to have the modem answer an incoming call only from specific message centre telephone numbers.

4. A satellite receiver according to claim 1 further comprising means in the satellite receiver to place a call through the modem to a message centre, thereby establishing a connection between the modem and the message centre over which to receive the message.

5. A satellite receiver according to claim 1 wherein each message comprises a number of displays field and a text field, and wherein each message is displayed the number of times indicated by the number of displays field.

6. A satellite receiver according to claim 1 wherein each message comprises a time to display field and a text field, and wherein each message is discarded if not displayed by the time in the time to display field.

7. A satellite receiver according to claim 1 wherein each message comprises a message id field.

8. A satellite receiver according to claim 1 further comprising a subscriber enable/disable mechanism for a subscriber to enable and disable the display of messages.

9. A satellite receiver according to claim 1 further comprising a satellite service provider enable/disable mechanism for a satellite service provider to enable and disable the display of messages.

10. A satellite receiver according to claim 1 further comprising an override mechanism which enables the message centre to cause a message to be displayed notwithstanding whether the subscriber enable/disable mechanism or the satellite enable/disable mechanism has been disabled.

11. A satellite receiver according to claim 8 further comprising an override mechanism which enables the message centre to cause a message to be displayed notwithstanding whether the subscriber enable/disable mechanism or a satellite enable/disable mechanism has been disabled.

12. A satellite receiver according to claim 1 wherein a corresponding status record is maintained for each message, each status record including a number of displays field which is incremented each time the corresponding message is successfully displayed, and wherein the status records are occasionally transmitted to the message centre.

13. A satellite receiver according to claim 1 wherein a normal telephone is also connected to the same telephone line, wherein if a normal telephone call comes in during download of message information, the download session is terminated, and the normal telephone call is connected.

14. A satellite receiver according to claim 1 wherein said message buffer is a circular message buffer.

15. A system for delivering community interest messages to satellite television subscribers comprising a message centre and a satellite receiver, wherein:
   the message centre is for collecting community interest messages, and for being connected with a connection through a PSTN (public switched telephone network) to the satellite receiver, and for subsequently transmitting the community interest messages over the connection; and
   the satellite receiver is equipped to receive satellite signals from a satellite dish and to demodulate the satellite signals and display them as a video picture on a display, and the satellite receiver further comprises:
   a) a modem connected to the PSTN (public switched telephone network) for receiving the community interest messages sent by the message centre over the PSTN;
   b) a display overlay buffer;
   c) a message buffer;
   d) a satellite receiver control program running on a processor for storing the received community interest messages in the message buffer and for transferring a message from said message buffer to said display overlay buffer at times automatically determined by the satellite receiver control program; and
   e) a display interface module for combining the video picture with the message stored in the display overlay buffer to produce a display signal to be sent to the display to be displayed.

16. A system according to claim 15 wherein the message centre maintains a list of subscriber's directory numbers for each message.

17. A system according to claim 16 further comprising means in the message centre to place a call through the PSTN to a subscriber's directory number, wherein the satellite receiver further comprises a CLID receiver for identifying a CLID of the call as being a CLID associated with the message centre and thereby determining that the satellite receiver should answer the incoming call to establish said connection.

18. A system according to claim 16 further comprising means in the satellite receiver to periodically place a call to a message centre directory number thereby leading to the establishment of said connection.

19. A method of delivering community interest messages to satellite television subscribers comprising the steps of:
   establishing a telephone line connection between a message centre and a particular subscriber's satellite receiver;

the message centre transmitting a message to the satellite receiver over the connection; and the satellite receiver receiving the message and storing it in a message buffer;

the satellite receiver transferring a message from said message buffer to a display overlay buffer at times automatically determined by the satellite receiver control program;

the satellite receiver combining a video picture with the message stored in the display overlay buffer to produce a display signal to be sent to the display to be displayed.

20. A method according to claim 19 further comprising the step of the satellite receiver located in the particular subscriber's premises identifying the call as a message centre call and answering the call thereby establishing said connection between the satellite receiver and the message centre.

21. A method according to claim 19 further comprising the step of the satellite receiver periodically dialling through a modem a message centre directory number thereby leading to the establishment of said connection.

22. A method according to claim 19 further comprising the steps of:

the satellite receiver storing the message in a circular buffer;

the satellite receiver sequentially copying messages from the circular buffer into an overlay display memory forming part of the satellite receiver; and the satellite receiver combining the video signal with the contents of the overlay display memory and displaying this combination on the display.

* * * * *

UNITED STATES PATENT AND TRADEMARK OFFICE
CERTIFICATE OF CORRECTION

PATENT NO. : 5,937,329
DATED : 08/10/99
INVENTOR(S) : DIA HELMY and LEN STONE

It is certified that error appears in the above-identified patent and that said Letters Patent is hereby corrected as shown below:

Column 9, line 7 (Claim 19): change "by the satellite" to "by a satellite"

Signed and Sealed this

Twenty-ninth Day of February, 2000

Attest:

Q. TODD DICKINSON

*Attesting Officer*      *Commissioner of Patents and Trademarks*